United States Patent
Inoue

(10) Patent No.: US 10,642,550 B2
(45) Date of Patent: May 5, 2020

(54) INFORMATION PROCESSING APPARATUS, TERMINAL, CONTROL METHOD AND PROGRAM TO ESTABLISH WIRELESS CONNECTION BASED ON OPERATING FREQUENCY

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/228,157

(22) Filed: Dec. 20, 2018

(65) Prior Publication Data
US 2019/0205071 A1    Jul. 4, 2019

(30) Foreign Application Priority Data
Dec. 28, 2017    (JP) .................... 2017-254342

(51) Int. Cl.
| | |
|---|---|
| *G06F 3/12* | (2006.01) |
| *H04W 76/18* | (2018.01) |
| *H04W 76/14* | (2018.01) |
| *H04W 84/12* | (2009.01) |

(52) U.S. Cl.
CPC .......... *G06F 3/1236* (2013.01); *G06F 3/121* (2013.01); *G06F 3/1284* (2013.01); *G06F 3/1292* (2013.01); *H04W 76/14* (2018.02); *H04W 76/18* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 2009/0175446 A1* | 7/2009 | Ikeda | H04L 63/0428 380/255 |
| 2016/0227353 A1* | 8/2016 | Sueyoshi | G06Q 20/3278 |

FOREIGN PATENT DOCUMENTS

JP       2013-062786 A       4/2013

* cited by examiner

*Primary Examiner* — Lennin R Rodriguezgonzalez
(74) *Attorney, Agent, or Firm* — Canon U.S.A., Inc. IP Division

(57) ABSTRACT

An information processing apparatus that wirelessly communicates with an external apparatus includes an acquisition unit that acquires a wireless connection start request and wireless communication information about the external apparatus, and a control unit that starts a wireless connection with the external apparatus based on the external apparatus' wireless communication information in a case where the wireless communication information about the external apparatus matches wireless communication information about the information processing apparatus.

24 Claims, 14 Drawing Sheets

FIG.8

Command List
1. WIRELESS DIRECT START INSTRUCTION
2. WIRELESS DIRECT INFORMATION
   ACQUISITION REQUEST
3. WIRELESS DIRECT SUSPENSION
   INSTRUCTION

FIG.14

```
Connection Service
 Characteristic
 -Command        1
 -Frequency      5
 -WiFi Spec      ac
 -CommandResult  --
```

INFORMATION PROCESSING APPARATUS, TERMINAL, CONTROL METHOD AND PROGRAM TO ESTABLISH WIRELESS CONNECTION BASED ON OPERATING FREQUENCY

BACKGROUND

Field

The present disclosure relates to an information processing apparatus, an external apparatus, and an information processing method.

Description of the Related Art

As the Institute of Electrical and Electronics Engineers (IEEE) 802.11 standard, higher-speed 802.11ac has recently been defined in addition to 802.11a/b/g/n. The IEEE 802.11ac/a standard uses a frequency band of 5 GHz, while the IEEE 802.11b/g standard uses a frequency band of 2.4 GHz. The IEEE 802.11n standard supports both the frequency bands of 2.4 GHz and 5 GHz. However, the IEEE 802.11n standard generally uses a frequency band of 2.4 GHz. General mobile terminals and printing apparatuses support these wireless LAN standards.

A handover connection method is widely used (e.g., see Japanese Patent Application Laid-Open No. 2013-062786) to directly connect a mobile terminal and a printing apparatus via a wireless local area network (LAN). The mobile terminal sends an instruction to start a wireless direct mode in the printing apparatus by Near Field Radio Communication (NFC) or Bluetooth® Low Energy. When the wireless direct mode is activated in the printing apparatus, the printing apparatus transmits a service set identifier (SSID) and key information about the printing apparatus to the mobile terminal by NFC or Bluetooth® Low Energy. The mobile terminal establishes a wireless LAN connection with the printing apparatus by using the received SSID and key information.

If the operating frequencies of the mobile terminal and the printing apparatus do not match, the printing apparatus cannot establish a connection with the mobile terminal. For example, in a case where the mobile terminal operates at 2.4 GHz in the IEEE 802.11n standard and the printing apparatus activates the wireless direct mode at 5 GHz in the IEEE 802.11ac standard, the operating frequencies of the mobile terminal and the printing apparatus do not match, which makes it impossible to establish a wireless LAN connection between the mobile terminal and the printing apparatus.

Accordingly, even in a case where a user performs NFC touch or Bluetooth® Low Energy near-field communication using a mobile terminal, if the frequencies of the mobile terminal and the printing apparatus do not match, a wireless LAN connection between the mobile terminal and the printing apparatus cannot be established.

SUMMARY

According to an aspect of the present disclosure, an information processing apparatus that wirelessly communicates with an external apparatus includes an acquisition unit configured to acquire a wireless connection start request and wireless communication information about the external apparatus, and a control unit configured to start a wireless connection with the external apparatus based on the external apparatus' wireless communication information in a case where the external apparatus' wireless communication information matches wireless communication information about the information processing apparatus.

Further features will become apparent from the following description of exemplary embodiments with reference to the attached drawings.

BRIEF DESCRIPTION OF THE DRAWINGS

FIG. 8 illustrates an example of instruction information.

FIG. 14 illustrates an example of Generic Attribute Profile (GATT) characteristics of Bluetooth® Low Energy.

DESCRIPTION OF THE EMBODIMENTS

Exemplary embodiments of the present disclosure will be described below with reference to the drawings.

Figure 1:
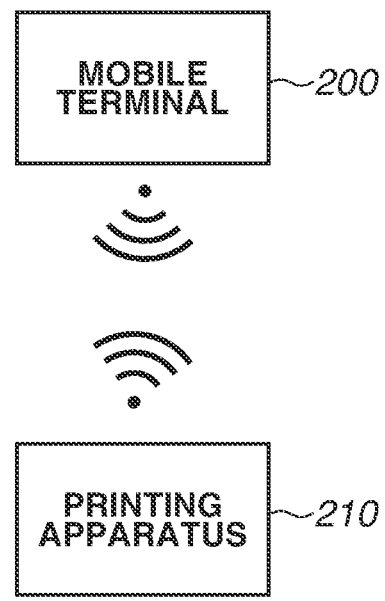
FIG. 1 illustrates an example of a system configuration of a communication system.

A first exemplary embodiment will be described below. A system configuration of a communication system will be described with reference to FIG. 1. A printing apparatus 210 includes a wireless local area network (LAN) function and operates in an access point mode. A mobile terminal 200 also includes a wireless LAN function. The mobile terminal 200 requests the printing apparatus 210 operating in the access point mode to establish a wireless LAN connection, and directly establishes the wireless LAN connection. The direct wireless LAN communication of the printing apparatus 210 is not limited to the access point mode, and any function can be used as long as the function supports a direct wireless LAN connection. For example, a Wi-Fi Direct® mode defined by the Wi-Fi® Alliance can be used. The direct wireless LAN communication is an example of wireless communication. The printing apparatus 210 is an example of an information processing apparatus.

Figure 2:
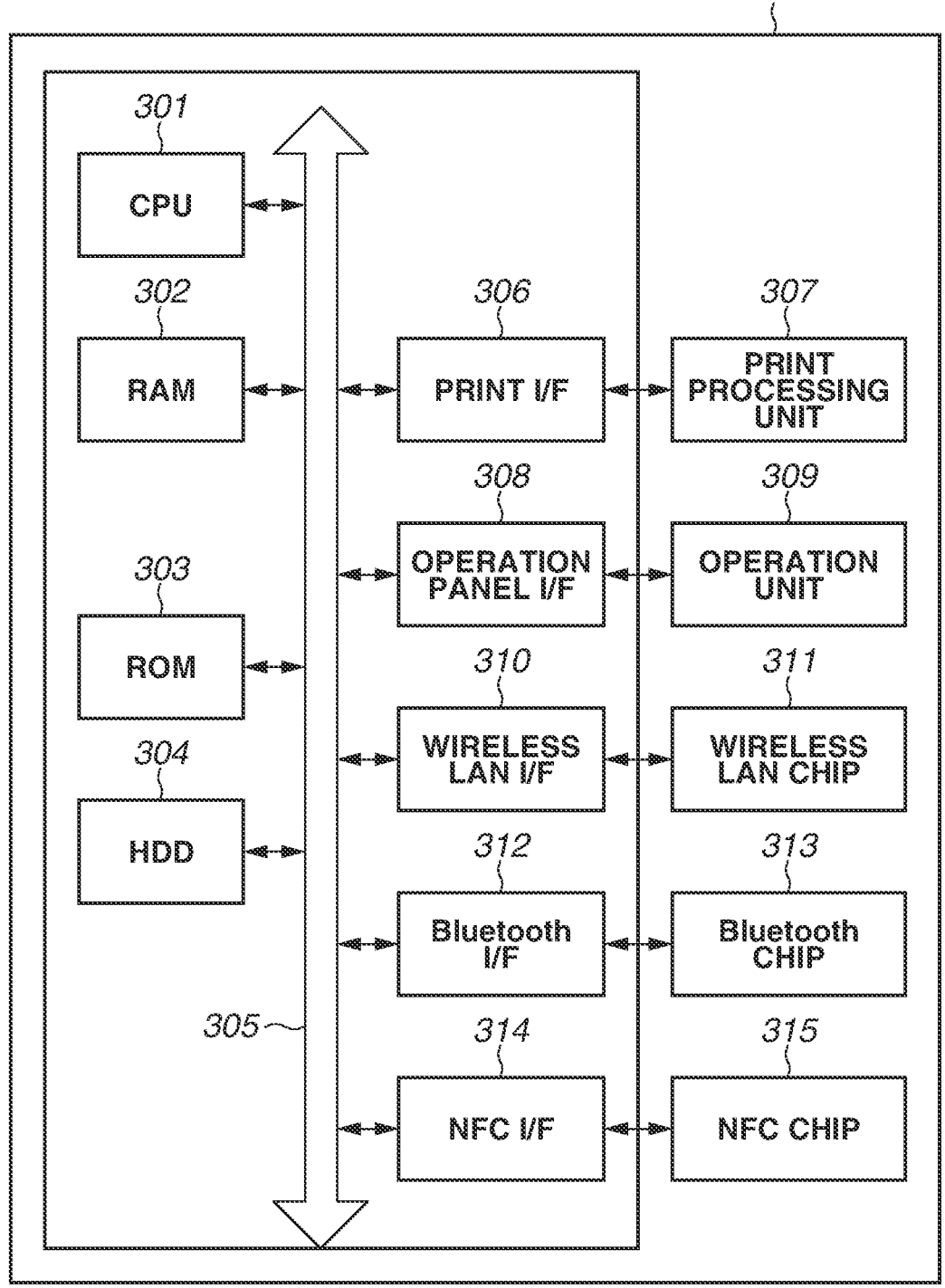
FIG. 2 illustrates an example of a hardware configuration of a printing apparatus.

Next, a hardware configuration of the printing apparatus 210 will be described with reference to FIG. 2.

A central processing unit (CPU) 301 reads programs stored in a read-only memory (ROM) 303 and executes various processes for controlling the operation of the printing apparatus 210. The ROM 303 stores programs. A random access memory (RAM) 302 is used as a temporary storage area such as a main memory or a work area for the CPU 301. A hard disk drive (HDD) 304 stores various data such as images.

Figure 10:
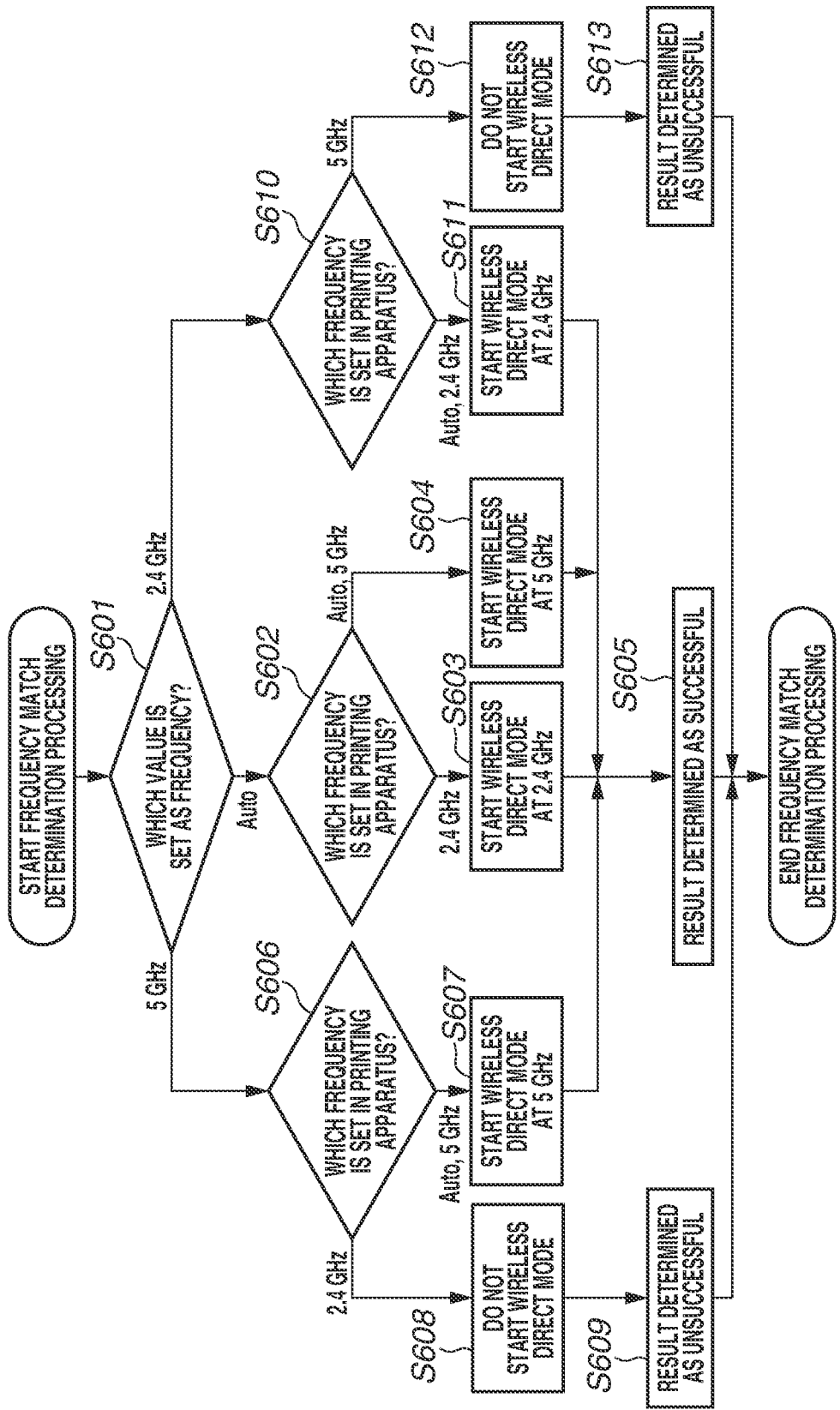
FIG. 10 is a flowchart illustrating an example of information processing for the printing apparatus.

In the printing apparatus 210, a single CPU 301 executes processes in flowcharts illustrated in FIGS. 6 and 10 as described below. However, other configurations can also be employed. For example, a plurality of CPUs can cooperatively execute the processes in the flowcharts illustrated in FIGS. 6 and 10.

A print interface (I/F) 306 performs printing and paper discharge processing based on image data designated by a print processing unit 307.

An operation panel I/F 308 displays various images on an operation unit 309. The operation unit 309 is a liquid crystal display unit including a touch panel function. A user can input an instruction and information to the printing apparatus 210 via the operation unit 309.

A wireless LAN I/F 310 executes wireless LAN communication with an external apparatus, such as the mobile terminal 200, via a wireless LAN chip 311.

A Bluetooth® I/F 312 executes Bluetooth communication with the external apparatus via a Bluetooth® chip 313. The Bluetooth® communication includes Bluetooth® Low Energy.

A Near Field Radio Communication (NFC) I/F 314 executes NFC communication with an external terminal via an NFC chip 315.

Figure 3:
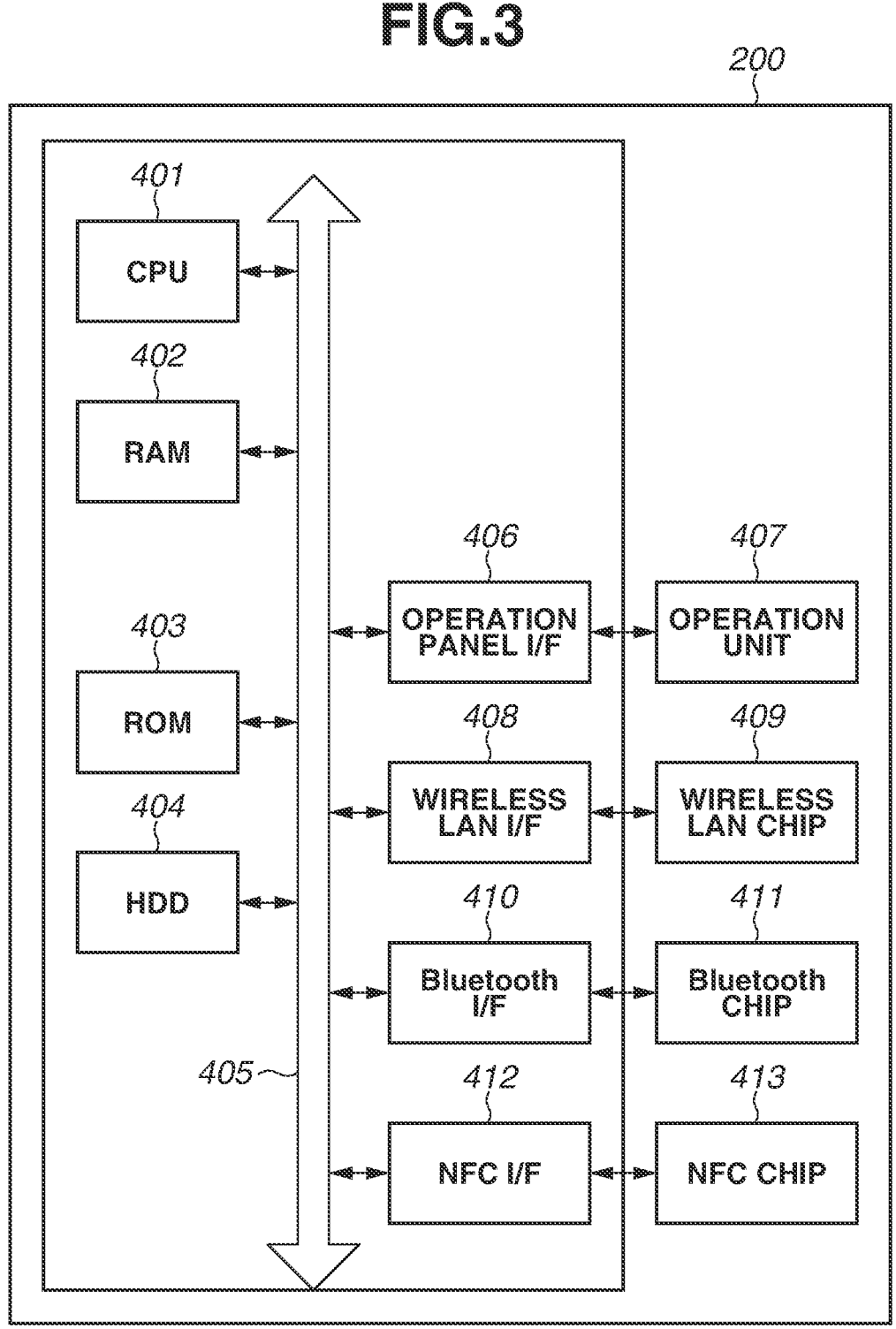
FIG. 3 illustrates an example of a hardware configuration of a mobile terminal.

Next, a hardware configuration of the mobile terminal 200 will be described with reference to FIG. 3. The mobile terminal 200 according to the present exemplary embodiment can be any apparatus such as a laptop computer or a tablet as long as the apparatus includes a wireless LAN function.

A CPU 401 reads programs stored in a ROM 403 and executes various processes for controlling the operation of the mobile terminal 200. The ROM 403 stores programs. A RAM 402 is used as a temporary storage area such as a main memory or a work area for the CPU 401. A HDD 404 stores various data such as images.

In the mobile terminal 200, a single CPU 401 executes processes in a flowchart illustrated in FIG. 12 as described below. However, other configurations can also be employed. For example, a plurality of CPUs can cooperatively execute the processes in the flowchart illustrated in FIG. 12.

An operation panel I/F 406 displays various images on an operation unit 407. The operation unit 407 is a liquid crystal display unit including a touch panel function. The user can input an instruction and information to the mobile terminal 200 through the operation unit 407.

A wireless LAN I/F 408 executes wireless LAN communication with an external apparatus, such as the printing apparatus 210, via a wireless LAN chip 409.

A Bluetooth I/F 410 executes Bluetooth communication with the external apparatus via a Bluetooth® chip 411. The Bluetooth® communication includes Bluetooth® Low Energy.

An NFC I/F 412 executes NFC communication with the external terminal through an NFC chip 413.

Figure 4:
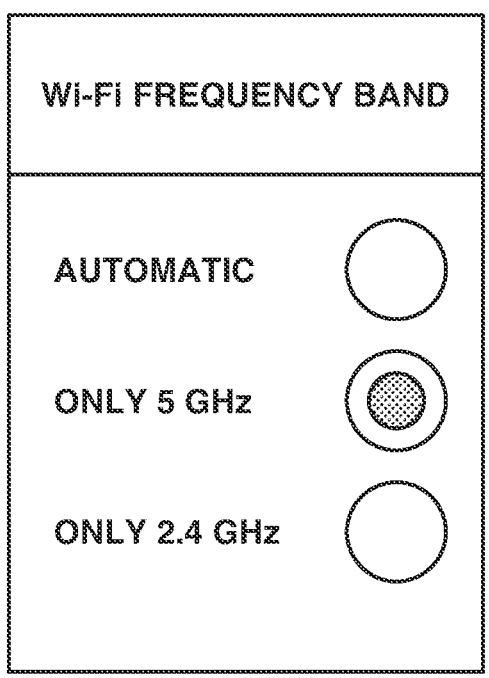
FIG. 4 illustrates an example of a user interface (UI) for changing a frequency band.

FIG. 4 illustrates an example of a user interface (UI) for changing a frequency band during a wireless direct mode in the printing apparatus 210. The UI includes exclusive settings such as "automatic", "5 GHz", and "2.4 GHz". For example, if the user wishes to just use the 802.11ac standard, the user selects "5 GHz". Then, the printing apparatus 210 starts the wireless direct mode in the 802.11ac standard. If the user wishes to just use the 802.11n standard, the user selects "2.4 GHz". Then, the printing apparatus 210 starts the wireless direct mode in the 802.11n standard. The setting of "automatic" indicates a setting in which all wireless LAN standards supported by the printing apparatus 210 are enabled and the wireless direct mode is started at an operating frequency that is instructed from the mobile terminal 200. If the operating frequency is not instructed from the mobile terminal 200, the printing apparatus 210 starts the wireless direct mode in the higher-speed 802.11ac. However, this setting can be changed and the printing apparatus 210 can also start the wireless direct mode in the 802.11n standard.

FIG. 4 illustrates an example of a UI for changing a frequency band in the mobile terminal 200. For example, if the user wishes to just use the 802.11ac standard, the user selects "5 GHz". As a result, just the 802.11ac standard is enabled in the mobile terminal 200, and the mobile terminal 200 just searches for a service set identifier (SSID) in 5 GHz band. If the user wishes to just use the 802.11n standard, the user selects "2.4 GHz". As a result, just the 802.11n standard is enabled in the mobile terminal 200, and the mobile terminal 200 just searches for the SSID in 2.4 GHz band. When "automatic" is set, all wireless LAN standards supported by the mobile terminal 200 are enabled. For example, if the mobile terminal 200 supports the 802.11ac and 802.11n standards, the mobile terminal 200 searches for the SSID in both the frequency bands of 5 GHz and 2.4 GHz.

Figure 5:
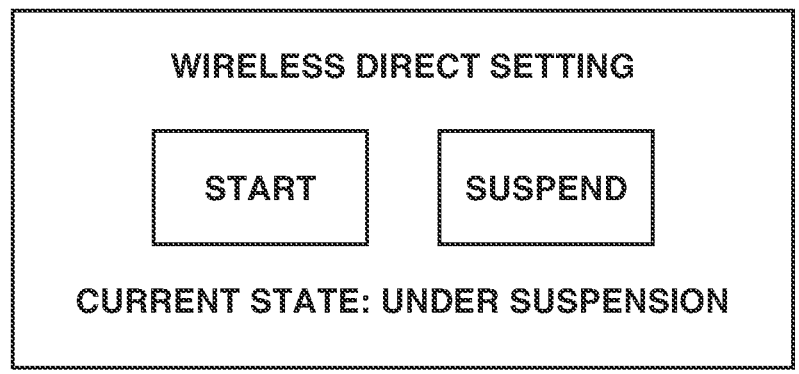
FIG. 5 illustrates an example of a UI for starting and suspending a wireless direct mode.

FIG. 5 illustrates an example of a UI for starting and suspending the wireless direct mode in the printing apparatus 210. If the user selects a "start" button from the screen, the printing apparatus 210 starts the wireless direct mode. If the user selects a "suspend" button after the wireless direct mode is started, the printing apparatus 210 suspends the wireless direct mode.

Next, processing in which the printing apparatus 210 acquires frequency band information about the mobile terminal 200 by NFC and starts the wireless direct mode at an identical operating frequency will be described with reference to the flowchart illustrated in FIG. 6.

Figure 7:
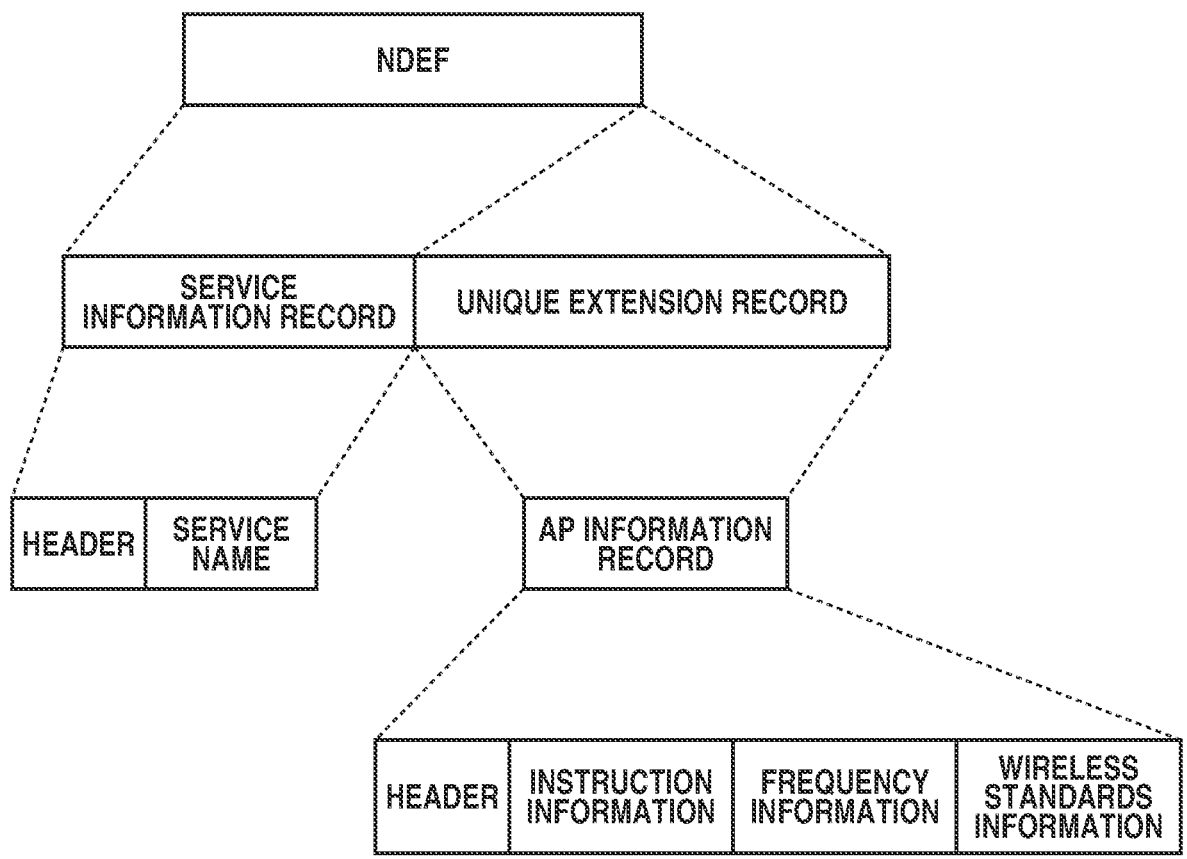
FIG. 7 illustrates an example of Near Field Radio Communication (NFC) Data Exchange Format (NDEF) data.

In step S501, the CPU 301 determines whether NFC Data Exchange Format (NDEF) data has been written from the mobile terminal 200 via the NFC chip 413. FIG. 7 illustrates an example of NDEF data to be written. The NDEF data stores instruction information as illustrated in FIG. 8, and information about frequency and frequency standards with which the mobile terminal 200 operates. Examples of the instruction information include "wireless direct start instruction" and "wireless direct suspension instruction".

In the present exemplary embodiment, the instruction information includes "wireless direct start instruction". If the CPU 301 determines that NDEF data has been written (YES in step S501), the processing proceeds to step S502. If the CPU 301 determines that no NDEF data has been written (NO in step S501), the processing of step S501 is repeated. The wireless direct start instruction is an example of a wireless connection start request.

In step S502, the CPU 301 determines whether the printing apparatus 210 has already started the wireless direct mode. If the CPU 301 determines that the wireless direct mode is already started (YES in step S502), the processing proceeds to step S505. If the CPU 301 determines that the wireless direct mode is not already started (NO in step S502), the processing proceeds to step S503.

Figure 9:
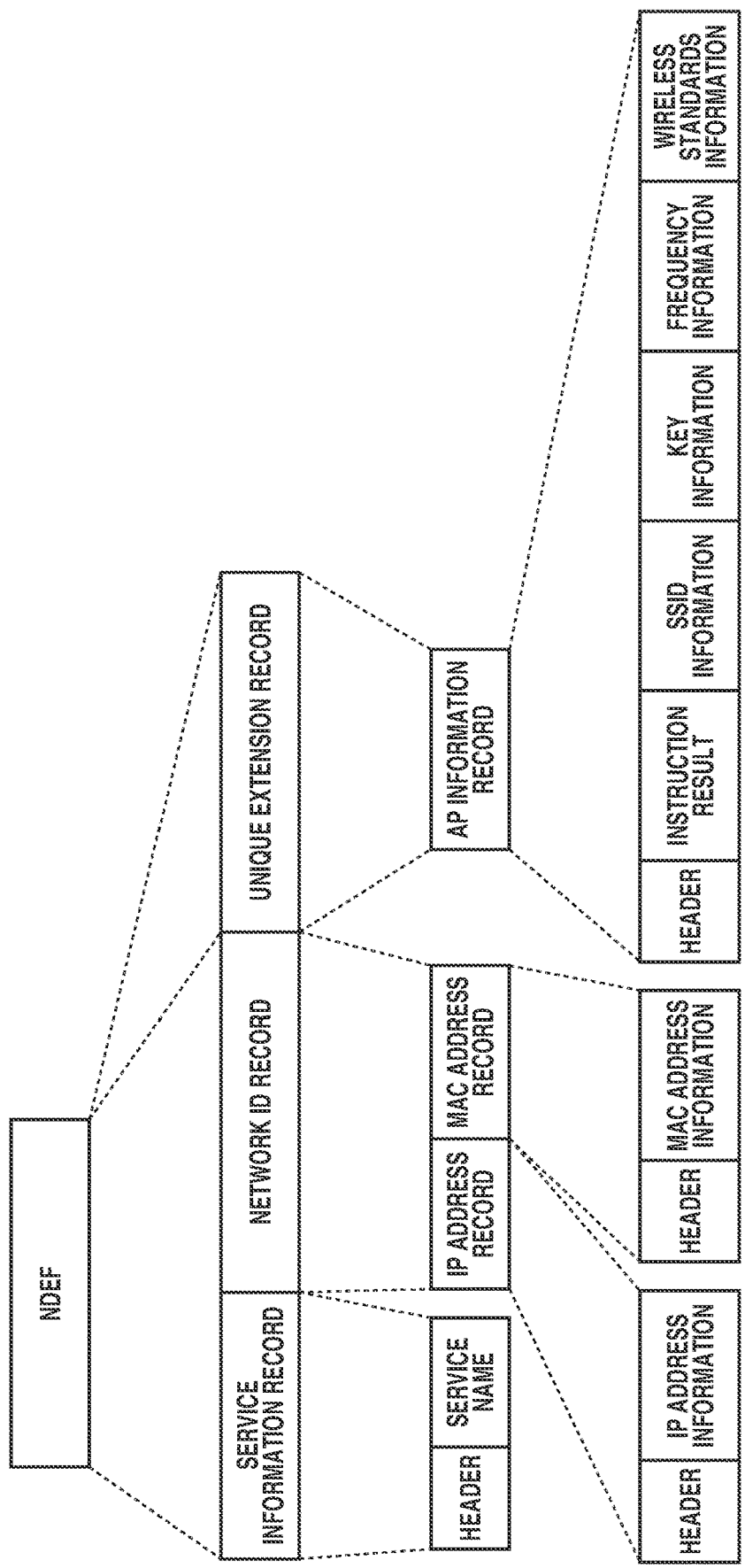
FIG. 9 illustrates an example of NDEF data.

In step S505, to notify the currently-operating SSID and key information, the CPU 301 stores the SSID and key information in response NDEF data as illustrated in FIG. 9. The CPU 301 stores an "already started" record in an "instruction result" area illustrated in FIG. 9. The CPU 301 sends the NDEF data to the mobile terminal 200 via the NFC chip 413.

In step S503, the CPU 301 determines whether the mobile terminal's 200 frequency information is included in the written NDEF data. If the frequency information is not included in the NDEF data (NO in step S503), the processing proceeds to step S508. If the frequency information is included in the NDEF data (YES in step S503), the processing proceeds to step S504.

In step S508, the CPU 301 determines the operating frequency setting in the printing apparatus 210. For example, the CPU 301 can determine the operating frequency setting based on the frequency setting made in advance as illustrated in FIG. 4. If the operating frequency is set to "2.4 GHz", the processing proceeds to step S509. If the operating frequency is set to "5 GHz" or "automatic (Auto)", the processing proceeds to step S510.

In step S509, the CPU 301 starts the wireless direct mode in the 802.11n standard.

In step S510, if the operating frequency is set to "5 GHz", the CPU 301 starts the wireless direct mode in the 802.11ac standard. If the operating frequency is set to "automatic", the CPU 301 starts the wireless direct mode in the higher-speed 802.11ac standard. When "automatic" is set, the setting for starting the wireless direct mode in any of the frequency bands can be changed.

If the processing of starting the wireless direct mode is completed, in step S505, the CPU 301 stores the SSID and key information, "start instruction successful", frequency information and the like based on which the wireless direct mode is started in the NDEF data illustrated in FIG. 9, and sends the NDEF data to the mobile terminal 200.

If the mobile terminal's 200 frequency information is included in the NDEF data (YES in step S503), the processing proceeds to step S504. In step S504, the CPU 301 performs frequency match determination processing. The frequency match determination processing will be described with reference to the flowchart illustrated in FIG. 10.

In step S601, the CPU 301 determines a frequency value. Alternatively, a wireless LAN standard name that can identify the frequency information can be used instead of the frequency value. If the CPU 301 determines that the frequency is 5 GHz, the processing proceeds to step S606. If the CPU 301 determines that the frequency is 2.4 GHz, the processing proceeds to step S610. If the CPU 301 determines that the frequency is set to "automatic", the processing proceeds to step S602.

In step S606, the CPU 301 compares the frequency set in the printing apparatus 210 with the frequency set in the mobile terminal 200 and determines whether the frequencies match. If the frequency of the printing apparatus 210 is set to 2.4 GHz, the processing proceeds to step S608. If the frequency of the printing apparatus 210 is set to 5 GHz or automatic, the processing proceeds to step S607.

Since a connection cannot be established due to a mismatch between the frequencies even if the wireless direct mode is started, in step S608, the CPU 301 determines not to start the wireless direct mode.

In step S609, the CPU 301 determines that the frequency match determination processing is unsuccessful.

In step S607, the CPU 301 starts the wireless direct mode at 5 GHz in the 802.11ac standard. In step S605, the CPU 301 determines that the frequency match determination processing is successful. Step S607 is an example of a control process for starting a wireless connection.

In step S610, the CPU 301 compares the frequency set in the printing apparatus 210 with the frequency set in the mobile terminal 200 and determines whether the frequencies match. If the frequency of the printing apparatus is set to 5 GHz, the processing proceeds to step S612. If the frequency of the printing apparatus 210 is set to 2.4 GHz or automatic, the processing proceeds to step S611.

Since a connection cannot be established due to a mismatch between the frequencies even if the wireless direct mode is started, in step S612, the CPU 301 determines not to start the wireless direct mode.

In step S613, the CPU 301 determines that the frequency match determination processing is unsuccessful.

In step S611, the CPU 301 starts the wireless direct mode at 2.4 GHz in the 802.11n standard. In step S605, the CPU 301 determines that the frequency match determination processing is successful. Step S611 is an example of a control process for starting a wireless connection.

In step S602, the CPU 301 determines the frequency set in the printing apparatus 210. If the frequency of the printing apparatus 201 is set to 2.4 GHz, the processing proceeds to step S603. If the frequency of the printing apparatus 210 is set to 5 GHz, the processing proceeds to step S604. If the frequency of the printing apparatus 210 is set to "automatic", the CPU 301 starts the wireless direct mode at 5 GHz in the higher-speed 802.11ac standard, although a connection can be established at any frequency when the wireless connection is started.

In step S603, the CPU 301 starts the wireless direct mode at 2.4 GHz in the 802.11n standard. Step S603 is an example of a control process for starting a wireless connection.

In step S604, the CPU 301 starts the wireless direct mode at 5 GHz in the 802.11ac standard. Step S604 is an example of a control process for starting a wireless connection.

In step S605, the CPU 301 determines that the frequency match determination processing is successful.

Referring back to FIG. 6, the description of the flowchart illustrated in FIG. 6 will be continued.

If the result of the frequency match determination processing indicates successful, the processing proceeds to step S505. In step S505, the CPU 301 stores the SSID and key information, the instruction result indicating "successful", the frequency information and the like, based on which the wireless direct mode is started in the NDEF data illustrated in FIG. 9, and sends the NDEF data to the mobile terminal 200.

Figure 11:
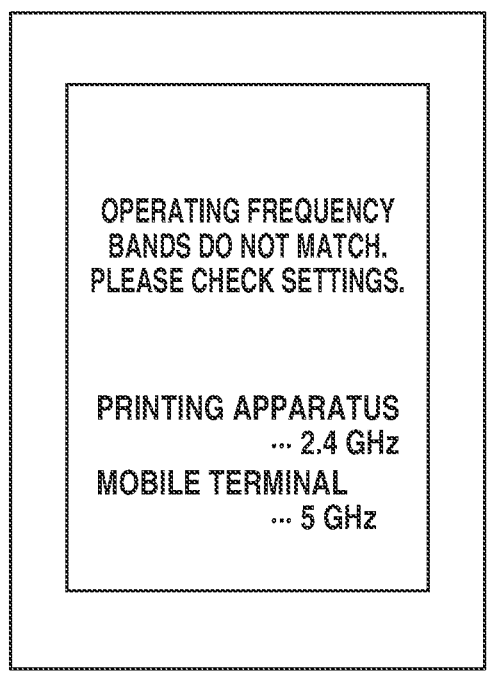
FIG. 11 illustrates an example of an error screen of the printing apparatus.

If the result of the frequency match determination processing indicates unsuccessful, the processing proceeds to step S506. In step S506, the CPU 301 displays an error screen indicating that a connection cannot be established due to a frequency mismatch as illustrated in FIG. 11 on the operation unit 309.

In step S507, the CPU 301 stores the instruction result indicating "unsuccessful due to a frequency mismatch" in the NDEF data, and sends the NDEF data to the mobile terminal 200.

Figure 12:
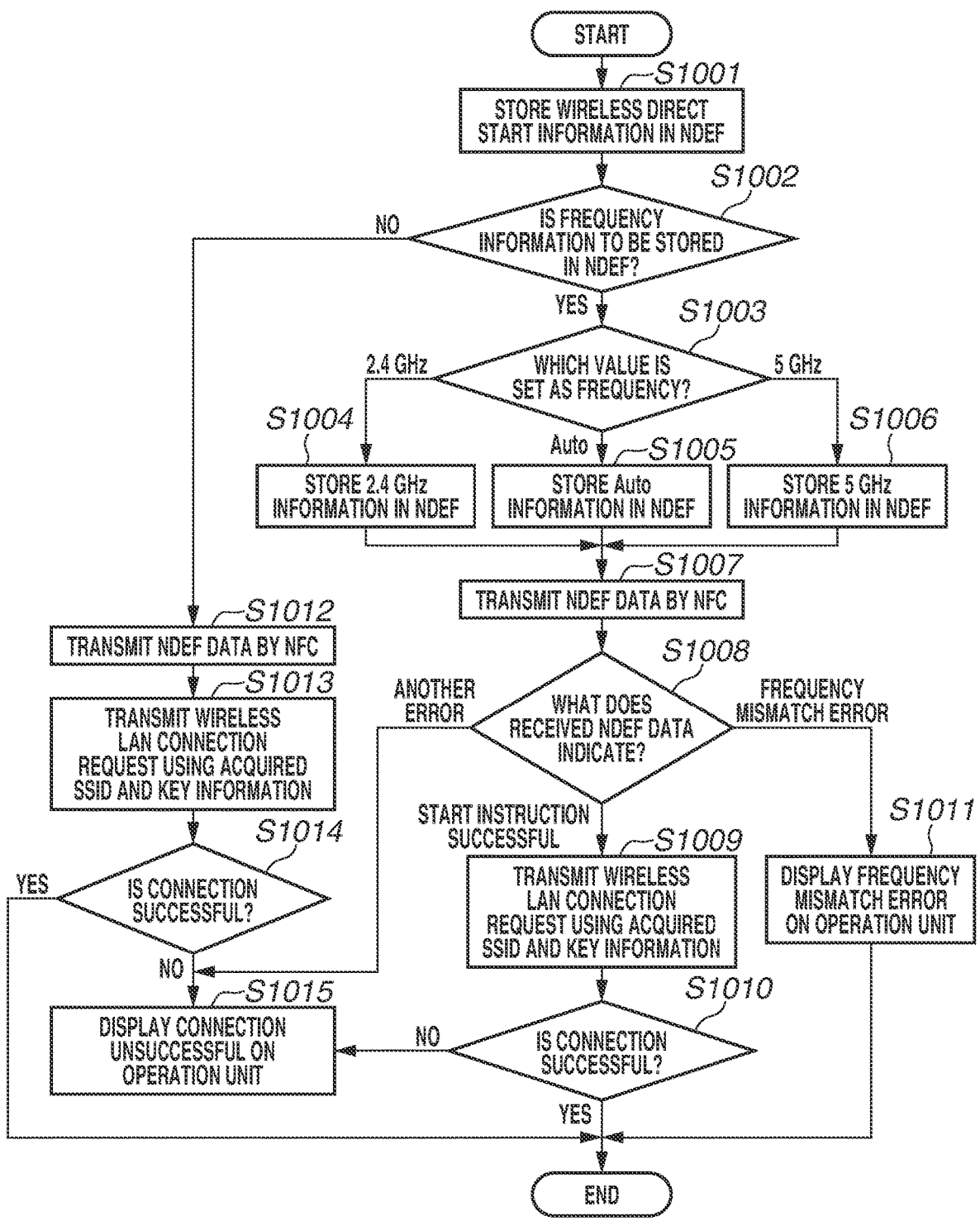
FIG. 12 is a flowchart illustrating an example of information processing for the mobile terminal.

FIG. 12 is a flowchart for the mobile terminal 200.

In step S1001, the CPU 401 stores data indicating "wireless direct start instruction" in a command instruction area of the NDEF data.

Next, in step S1002, the CPU 401 determines whether to include the frequency information about the printing apparatus 210 in the NDEF data. If the CPU 401 determines that the frequency information about the printing apparatus 210 is to be stored in the NDEF data (YES in step S1002), the processing proceeds to step S1003. If the frequency information about the printing apparatus 210 cannot be acquired for some reason (NO in step S1002), NDEF data is created without storing the frequency information, and then the processing proceeds to step S1012.

In step S1003, the CPU 401 determines the operating frequency set in the mobile terminal 200. If the operating frequency is set to 2.4 GHz, the processing proceeds to step S1004. If the operating frequency is set to 5 GHz, the processing proceeds to step S1006. If the operating frequency is set to "automatic", the processing proceeds to step S1005.

In step S1004, the CPU 401 stores data indicating 2.4 GHz in a frequency information area of the NDEF data. The CPU 401 stores data indicating the 802.11n standard corresponding to, for example, 2.4 GHz, in a wireless LAN standards information area.

In step S1006, the CPU 401 stores data indicating 5 GHz in the frequency information area of the NDEF data. The CPU 401 stores data indicating the 802.11ac standard corresponding to, for example, 5 GHz, in the wireless LAN standards information area.

In step S1005, the CPU 401 stores data indicating "automatic" in the frequency information area of the NDEF data. The CPU 401 stores data indicating all wireless LAN standards to be supported such as the 802.11n and 802.11ac standards, in the wireless LAN standards information area.

After the creation of the NDEF data is completed, in step S1007, the CPU 401 transmits the NDEF data to the printing apparatus 210 via the NFC chip 413. Then, the CPU 401 is in a standby state to wait for a response to NFC data from the printing apparatus 210.

In step S1008, upon receiving the response to the NFC data from the printing apparatus 210 via the NFC chip 413, the CPU 401 analyzes the received NDEF data. The CPU 401 acquires the "instruction result" area of the received NDEF data. If data indicating "a start instruction failure due to a mismatch between operating frequencies" (operation mismatch error) is stored, the processing proceeds to step S1011. If data indicating "another start instruction error" (another error) is stored, the processing proceeds to step S1015. The CPU 401 acquires the "instruction result" area of the received NDEF data, and if data indicating "start instruction successful" is stored, the processing proceeds to step S1009.

In step S1011, the CPU 401 displays a frequency mismatch error screen as illustrated in FIG. 11 on the operation unit 407.

Figure 13:
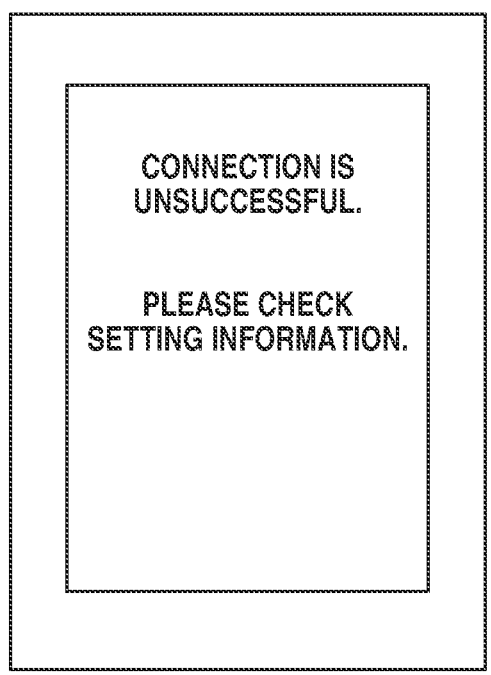
FIG. 13 illustrates an example of a connection error screen.

In step S1015, the CPU 401 displays a connection error screen as illustrated in FIG. 13 on the operation unit 407. Examples of "another start instruction error" include a case where the wireless direct setting in the printing apparatus 210 is disabled.

In step S1009, the CPU 401 transmits a wireless LAN connection request to the printing apparatus 210 by using the SSID and key information stored in the received NDEF data. The wireless LAN connection request is an example of a wireless connection request.

In step S1010, the CPU 401 determines whether the connection is successful. If the CPU 401 determines that the connection is successful (YES in step S1010), the processing of the flowchart illustrated in FIG. 12 ends. If the CPU 401 determines that the connection is unsuccessful (NO in step S1010), the processing proceeds to step S1015. If the connection has failed for the reason that, for example, a maximum number of wireless direct connections in the printing apparatus 210 has already reached an upper limit even when the pieces of frequency information match, the CPU 401 determines that the connection is unsuccessful. In step S1015, the CPU 401 displays the connection error screen as illustrated in FIG. 13 on the operation unit 407. Even when the received NDEF data includes no frequency information, if the "instruction result" area of the NDEF data indicates "start instruction successful", the CPU 401 attempts to establish a connection in step S1009. However, in this case, there is a possibility that a mismatch between operating frequencies can occur. Also in this case, it is determined that the connection is unsuccessful in step S1010, and in step S1015, the CPU 401 displays the connection error screen as illustrated in FIG. 13 on the operation unit 407.

In step S1012, the CPU 401 transmits NDEF data including no frequency information to the printing apparatus 210.

In step S1013, the CPU 401 receives a response to NDEF data from the printing apparatus 210, and attempts to establish a connection with the printing apparatus 210 by using the acquired SSID and key information.

In step S1014, the CPU 401 determines whether the connection is successful. If the CPU 401 determines that the connection is successful (YES in step S1014), the processing of the flowchart illustrated in FIG. 12 ends. If the CPU 401 determines that the connection is unsuccessful (NO in step S1014), the processing proceeds to step S1015. In step S1015, the CPU 401 displays the connection error screen as illustrated in FIG. 13 on the operation unit 407. Since it is unclear whether the connection is unsuccessful due to a frequency mismatch or due to the maximum number of connections in the printing apparatus 210 reaching the upper limit, the CPU 401 just needs to display the general-purpose error screen as illustrated in FIG. 13.

According to the present exemplary embodiment, the printing apparatus 210 starts the wireless direct mode at an operating frequency that matches the operating frequency of the mobile terminal 200, thereby preventing an error that occurs when a connection cannot be established due to a frequency mismatch after the wireless direct mode is started. At a time when a frequency mismatch before starting the wireless direct mode is detected, the printing apparatus 210 displays the error screen on the operation unit 309, thereby enabling notifying the user of the occurrence of an error earlier than before notification in the related art. In addition, there is an advantage that the wireless direct mode is not uselessly started.

In the present exemplary embodiment, the printing apparatus 210 compares the frequency information. However, the printing apparatus 210 can compare the wireless LAN standards information such as the 802.11n standard. The printing apparatus 210 can compare the wireless LAN standards information and start the wireless direct mode such that the wireless LAN standards information matches. Alternatively, the printing apparatus 210 can compare both the frequency information and the wireless LAN standards information.

A second exemplary embodiment will be described below. In the first exemplary embodiment, the operating frequencies are compared using NFC bidirectional communication and it is determined whether the operating frequencies match. However, it can be determined whether the operating frequencies match by using Bluetooth® Low Energy bidirectional communication.

In the case of using Bluetooth® Low Energy, data defined using NDEF data is defined as Bluetooth® Low Energy Generic Attribute Profile (GATT) characteristics. For example, as illustrated in FIG. 14, the data is defined using "command instruction", "operating frequency", "wireless LAN standards", "command instruction result", and the like as characteristics. Parameters that can be taken by each data are similar to those used in the first exemplary embodiment.

Figure 6:
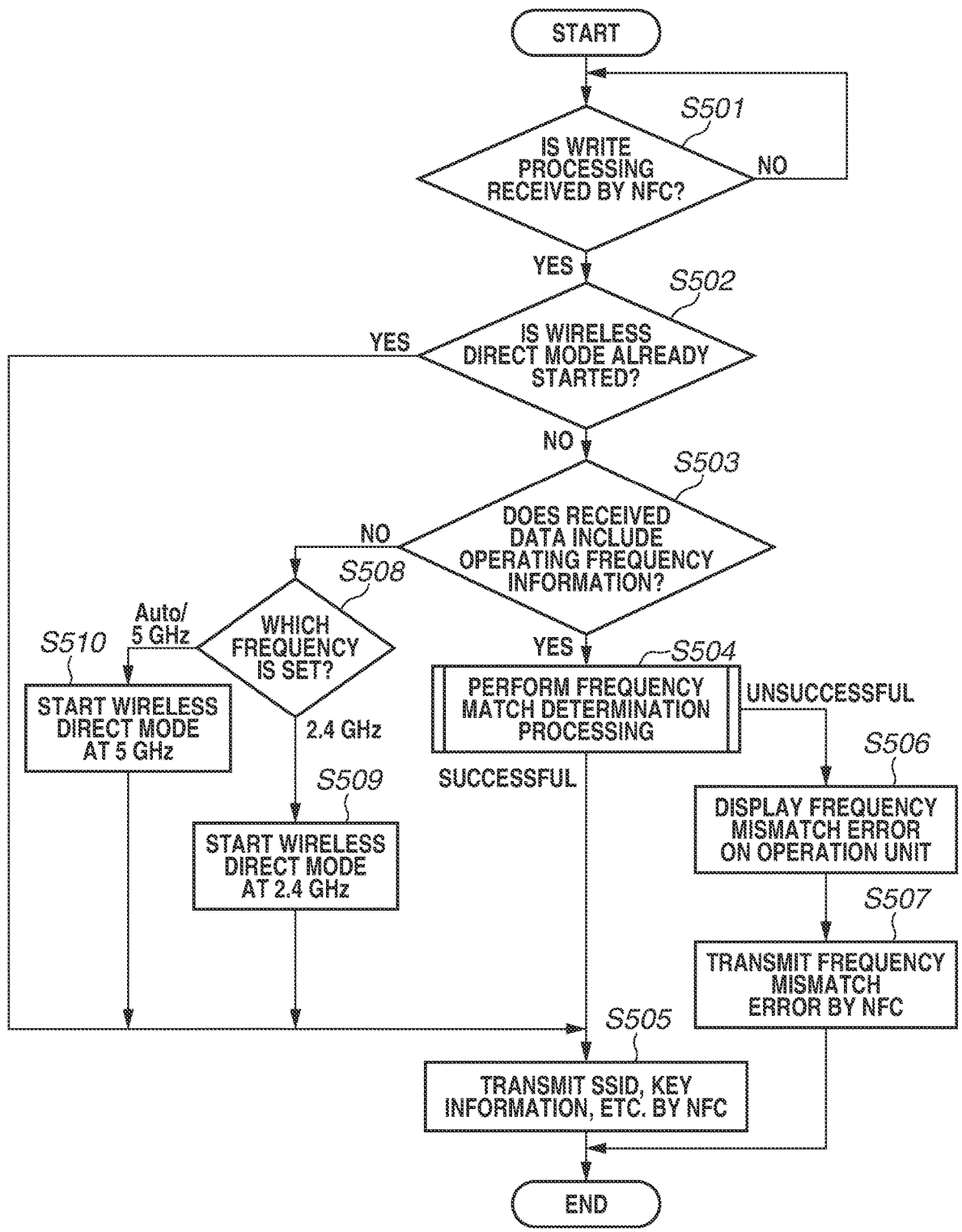
FIG. 6 is a flowchart illustrating an example of information processing for the printing apparatus.

A processing flow for the printing apparatus 210 according to the present exemplary embodiment is substantially the same as that illustrated in FIG. 6. The processing of receiving NDEF data by NFC in step S501 corresponds to processing of receiving GATT data by Bluetooth® Low Energy. The processing of transmitting response data in steps S505 and S507 corresponds to processing of transmitting data by Bluetooth® Low Energy.

A processing flow for the mobile terminal 200 according to the present exemplary embodiment is also substantially the same as that illustrated in FIG. 12. The processing of generating NDEF data in steps S1001 and S1002 corresponds to processing of generating GATT data by Bluetooth® Low Energy. The processing of transmitting data by NFC in steps S1007 and S1012 corresponds to processing of transmitting data by Bluetooth® Low Energy.

According to the above-described exemplary embodiments, the mobile terminal 200 notifies the printing apparatus 210 of the operating frequency by NFC or Bluetooth® Low Energy before a wireless LAN connection is established, thereby enabling the printing apparatus 210 to acquire the operating frequency at which the mobile terminal 200 is operating. Consequently, the printing apparatus 210 activates the wireless direct mode at the frequency that matches the frequency of the mobile terminal 200 when it is operating, thereby making it possible to establish a wireless LAN connection between the printing apparatus 210 and the mobile terminal 200 without causing a connection error due to a frequency mismatch.

According to the above-described exemplary embodiments, it is possible to avoid the occurrence of a connection error in wireless communication caused by the mismatch of information about the wireless communication.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-254342, filed Dec. 28, 2017, which is hereby incorporated by reference herein in its entirety.

What is claimed is:

1. An information processing apparatus having a communication interface, configured to operate the communication interface as an access point for executing wireless communication with an external terminal via no external access point, and configured to execute wireless communication by a first method with an external apparatus connected to the access point, the information processing apparatus comprising:
at least one memory that stores a set of instructions; and
at least one processor that executes the instructions, the instructions, when executed, causing the information processing apparatus to perform operations comprising:
receiving a wireless connection start request and wireless communication information about the external apparatus using wireless communication by a second method different from the wireless communication by the first method;
determining whether an operating frequency to be used for operating the information processing apparatus as an access point matches an operating frequency required by the external terminal based on the acquired wireless communication information and an operation setting about the access point; and
performing control to transmit connection information for connecting to the access point using the wireless communication by the second method in a case where it is determined that the operating frequency to be used for operating the information processing apparatus as the access point matches the operating frequency required by the external terminal, and to transmit information not including the connection information using the wireless communication by the second method in a case where it is determined that the operating frequency to be used for operating the information processing apparatus as the access point does not match the operating frequency required by the external terminal.

2. The information processing apparatus according to claim 1, wherein the connection information is transmitted using the wireless communication by the second method together with information indicating that the wireless connection is successful.

3. The information processing apparatus according to claim 1, wherein the operations further comprises controlling to display error information on a display device of the information processing apparatus, in a case where it is determined that the operating frequency to be used for operating the information processing apparatus as the access point does not match the operating frequency required by the external terminal.

4. The information processing apparatus according to claim 3, wherein the information not including the connection information is information indicating an error.

5. The information processing apparatus according to claim 1, wherein the operations further comprises starting control to operate the communication interface as an access point to be operated with an operating frequency corresponding to a setting based on the operation setting about the access point in a case where the request and the wireless communication information are not received.

6. The information processing apparatus according to claim 1, wherein the received wireless communication information is frequency information about a wireless local area network (LAN) in the external apparatus.

7. The information processing apparatus according to claim 1, wherein the received wireless communication information is information about a LAN standard in the external apparatus.

8. The information processing apparatus according to claim 1, wherein the information processing apparatus is a printing apparatus.

9. The information processing apparatus according to claim 1, wherein the wireless communication by the second method is a communication method based on Bluetooth standard.

10. The information processing apparatus according to claim 1, wherein the wireless communication by the second method is bidirectional communication using GATT (Generic Attribute Profile) of Bluetooth Low Energy.

11. The information processing apparatus according to claim 1, wherein the wireless communication by the second method is bidirectional communication using NFC.

12. An information processing method executed by an information processing apparatus having a communication interface, configured to operate the communication interface as an access point for executing wireless communication with an external terminal via no external access point, and configured to execute wireless communication by a first method with an external apparatus connected to the access point, the information processing method comprising:
 receiving a wireless connection start request and wireless communication information about the external apparatus using wireless communication by a second method different from the wireless communication by the first method; and
 determining whether an operating frequency to be used for operating the information processing apparatus as an access point matches an operating frequency required by the external terminal based on the acquired wireless communication information and an operation setting about the access point; and
 performing control to transmit connection information for connecting to the access point using the wireless communication by the second method in a case where it is determined that the operating frequency to be used for operating the information processing apparatus as the access point matches the operating frequency required by the external terminal, and to transmit information not including the connection information using the wireless communication by the second method in a case where it is determined that the operating frequency to be used for operating the information processing apparatus as the access point does not match the operating frequency required by the external terminal.

13. The information processing method according to claim 12, the method further comprising, transmitting, the connection information using the wireless communication by the second method together with information indicating that the wireless connection is successful.

14. The information processing method according to claim 12, wherein the method further comprises controlling to display error information on a display device of the information processing apparatus, in a case where it is determined that the operating frequency to be used for operating the information processing apparatus as the access point does not match the operating frequency required by the external terminal.

15. The information processing method according to claim 14, wherein the information not including the connection information is information indicating an error.

16. The information processing method according to claim 12, wherein the method further comprises starting control to operate the communication interface as an access point to be operated with an operating frequency corresponding to a setting based on the operation setting about the access point in a case where the request and the wireless communication information are not received.

17. The information processing method according to claim 12, wherein the received wireless communication information is frequency information about a wireless local area network (LAN) in the external apparatus.

18. The information processing method according to claim 12, wherein the received wireless communication information is information about a LAN standard in the external apparatus.

19. The information processing method according to claim 12, wherein the information processing apparatus is a printing apparatus.

20. The information processing method according to claim 12, wherein the wireless communication by the second method is a communication method based on Bluetooth standard.

21. The information processing method according to claim 12, wherein the wireless communication by the second method is bidirectional communication using GATT (Generic Attribute Profile) of Bluetooth Low Energy.

22. The information processing method according to claim 12, wherein the wireless communication by the second method is bidirectional communication using NFC.

23. A terminal apparatus that wirelessly communicates with an information processing apparatus, the terminal comprising:
 one or more processors; and
 one or more memories including instructions that, when executed by the one or more processors, cause the terminal apparatus to:
  notify the information processing apparatus of a wireless connection start request and wireless communication information about the terminal; and
  transmit a wireless connection request to the information processing apparatus based on information about an access point acquired from the information processing apparatus in a case where information indicating that a connection is successful is received as a result of the wireless connection start request and to display error information indicating occurrence of a mismatch of the wireless communication information in a case where information indicating that the connection is unsuccessful is received as a result of the wireless connection start request.

24. An information processing method executed by a terminal that wirelessly communicates with an information processing apparatus, the information processing method comprising:
 notifying the information processing apparatus of a wireless connection start request and wireless communication information about the terminal; and
 performing control to transmit a wireless connection request to the information processing apparatus based on information about an access point acquired from the information processing apparatus in a case where information indicating that a connection is successful is received as a result of the wireless connection start request and to display error information indicating occurrence of a mismatch of the wireless communication information in a case where information indicating that the connection is unsuccessful is received as a result of the wireless connection start request.

* * * * *